United States Patent
Leventhal et al.

(10) Patent No.: US 7,305,662 B1
(45) Date of Patent: *Dec. 4, 2007

(54) MECHANISM FOR LOSSLESS TRACING IN AN ARBITRARY CONTEXT

(75) Inventors: Adam H. Leventhal, San Francisco, CA (US); Bryan M. Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 773 days.

This patent is subject to a terminal disclaimer.

(21) Appl. No.: 10/713,411

(22) Filed: Nov. 14, 2003

(51) Int. Cl.
*G06F 9/44* (2006.01)
(52) U.S. Cl. .................. 717/128; 717/129; 717/130
(58) Field of Classification Search ......... 717/124–135

See application file for complete search history.

(56) References Cited

OTHER PUBLICATIONS

Tamches, "Fine-Grained Dynamic Instrumentation of Commodity Operating System Kernels", University of Wisconsin, pp. 1-141, 2001.*
Uhlig et al., "Trace-Driven Memory Simulation: A Survey", ACM, pp. 128-169, Jun. 1997.*
Richard Moore, et al.; "IBM Dynamic Probes"; http://www-124.ibm.com/developerworks/opensource/linux/projects/dprobes/README, 2000.

* cited by examiner

*Primary Examiner*—Ted T. Vo
(74) *Attorney, Agent, or Firm*—Osha Liang LLP

(57) ABSTRACT

A method for tracing an instrumented program, including triggering a probe in the instrumented program, obtaining an original instruction associated with the probe, loading the original instruction into a scratch space, and executing the original instruction in the scratch space using the thread, wherein executing the original instruction results in placing the instrumented program in a state equivalent to natively executing the original instruction.

17 Claims, 4 Drawing Sheets

MECHANISM FOR LOSSLESS TRACING IN AN ARBITRARY CONTEXT

CROSS REFERENCE TO RELATED APPLICATIONS

This application is related to an application entitled "Mechanism For Lossless Function Entry And Return Tracing" and application entitled "Mechanism For Lossless Tracing In An Architecture Having A Delay Slot", both filed simultaneously herewith, the disclosure of which is hereby incorporated by reference in its entirety.

BACKGROUND

Analyzing the dynamic behavior and performance of a complex software system is difficult. Typically, analysis of a software system is achieved by gathering data at each system call and post-processing the data. Data is gathered at each system by placing a probe at locations of interest in the software (i.e., instrumenting the software to obtain an instrumented program) and gathering data when the probe is encountered by the thread executing the instrumented program.

Probes are typically represented in the instrumented code as trap instructions. The location (i.e., address) of each trap instruction is stored in a look-up table and associated with an original instruction (i.e., the instruction that was replaced when the program is).

When a thread executing the instrumented program encounters a trap instruction, control is transferred to a trap handler, which calls into the tracing framework and performs the action(s) associated with the trap instruction. The trap handler then looks up the original instruction in the look-up table. The trap instruction is then overwritten by the original instruction (i.e., the original instruction is placed back in its original location within the code path replacing the trap instruction that was just executed). The tracing framework then single-steps the original instruction (i.e., the original instruction is executed and then control is returned to the kernel). The original instruction in the code path is then overwritten by the trap instruction that was originally encountered by the thread. The thread then resumes executing the instrumented program.

In a system in which more than one thread is executing within a given instrumented program, a particular thread may not trigger a probe (i.e., encounter a trap instruction) if the thread encounters the original instruction corresponding to a probe as opposed to the trap instruction. This situation typically occurs when a first thread encounters the trap instruction and overwrites it with a corresponding original instruction, and while this is occurring a second thread encounters the original instruction. In this scenario, the first thread calls into the tracing framework to perform the actions associated with the trap instruction, while the second thread executes the original instruction but does not call into the tracing framework. The aforementioned method for instrumenting a program is typically referred to as "lossfull" (i.e., all the requested tracing information is not obtained because in certain scenarios, such as the one described above, a probe within a give code path may not be encountered by all executing threads).

Alternatively, the original instructions may be replaced with a reserved trap instruction, and when a thread executing the instrumented program encounters the reserved trap, all threads executing in the instrumented program are suspended while the thread that caused the trap single-steps the original instruction, which is temporarily written over the trap instruction, as defined above. Note that by suspending all the threads executing when the instrumented program when trap is encountered by one of the threads, the execution of the tracing framework is effectively serialized. After the thread has single-stepped the original instruction, the reserved trap that was encountered by the thread is copied back over the original instruction in the code path. All threads executing in the instrumented program then resume executing the instrumented program. The aforementioned method for instrumenting a program is typically referred to as "lossless" (i.e., all the requested tracing information is obtained because the threads executing the instrumented program encounter all the probes in the code path in which they are executing).

SUMMARY

In general, in one aspect, an embodiment of the invention relates to a method for tracing an instrumented program, comprising triggering a probe in the instrumented program, obtaining an original instruction associated with the probe, loading the original instruction into a scratch space, and executing the original instruction in the scratch space using the thread, wherein executing the original instruction results in placing the instrumented program in a state equivalent to natively executing the original instruction.

In general, in one aspect, an embodiment of the invention relates to a system for tracing an instrumented program, comprising a thread configured to execute the instrumented program, a look-up table arranged to store an address and a corresponding original instruction, a trap handler configured to halt execution of the thread when a trap instruction is encountered and using an address of the trap instruction to obtain the corresponding original instruction from the look-up table, a scratch space arranged to store the original instruction, and an execution facility for executing the original instruction to obtain data.

Other aspects of embodiments of the invention will be apparent from the following description and the appended claims.

DETAILED DESCRIPTION

Figure 1:
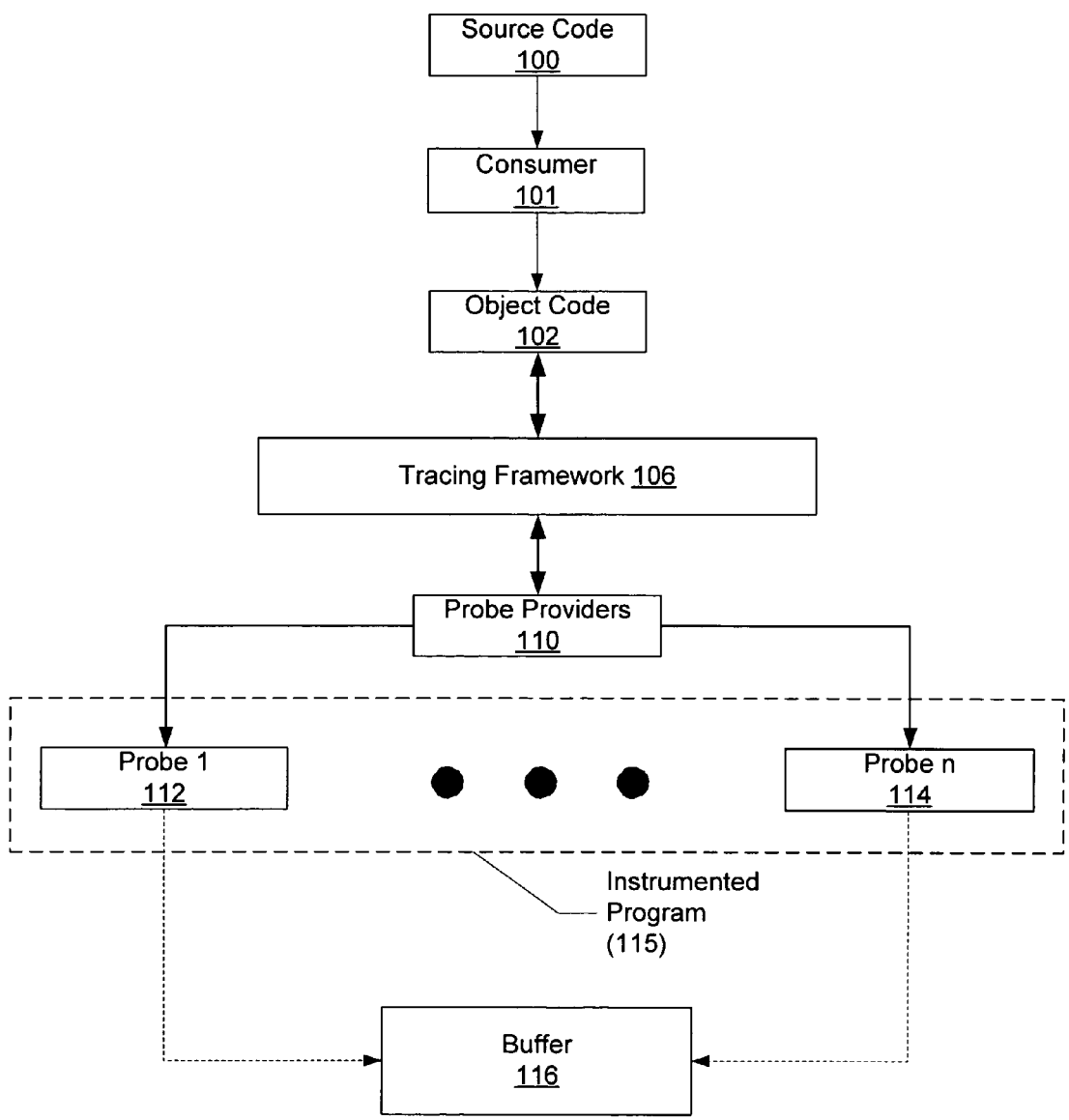
FIG. 1 shows a tracing framework architecture in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention relates to method and apparatus for tracing an instrumented program. More specifically, the invention relates to a method and apparatus for lossless tracing of an instrumented program.

FIG. 1 shows a flow diagram detailing the collection of data in accordance with one embodiment of the invention. Specifically, FIG. 1 provides an overview of the process for collecting data for the buffer (116). Initially, source code (100) is written/obtained/generated that defines a tracing function (i.e., a request to obtain certain data). More specifically, the tracing function defines which probes (112, 114) to enable within the instrumented program (115), and what actions that the tracing framework (106) is to perform when the probes (112, 114) are triggered (i.e., when a thread executing the instrumented program (115) encounters the probe (112, 114)). In one or more embodiments of the invention, a tracing function may define one or more actions that the tracing framework (106) is to perform when a probe (112, 114) is encountered.

The source code (100) is typically associated with a consumer (101). Note that a consumer (101) may define one or more tracing functions. The consumer is a virtual client that sends requests, in the form of tracing functions, to the tracing framework (106) to obtain information about the instrumented program (115). Further, the consumer (101) also retrieves the requested information, which is stored by the tracing framework (106) in the associated buffers (116).

The source code (100) is subsequently forwarded, via the consumer (101) to a compiler (not shown), where the source code (100) is compiled to generate executable object code (102). The object code (102) is then communicated to a tracing framework (106). The tracing framework (106) includes functionality to execute the object code (102). Specifically, the tracing framework (106) interprets the object code (102) and directs the probe providers (110) to activate certain probes (112, 114) within the instrumented program (115).

The probes (112, 114) gather the specified information from the instrumented program (115), as defined by the object code (102) derived from the actions defined within the source code (100), and forward the information (directly or indirectly) to a corresponding buffer (116).

In one or more embodiments of the invention, each probe (112, 114) in the instrumented program (115) is represented by a trap instruction. The address corresponding to location of the trap instruction within the instrumented program (115) is recorded in a look-up table along with the original instruction (i.e., the particular instruction that the consumer would like to execute to obtain data). In one embodiment of the invention, the original instruction corresponds to an action that is to be performed when the probe (112, 114) is encountered. The action, as noted above, is typically defined by the consumer (101). In one embodiment of the invention, representing each probe as a trap instruction and generating a corresponding look-up table may be performed by the tracing framework.

Figure 2:
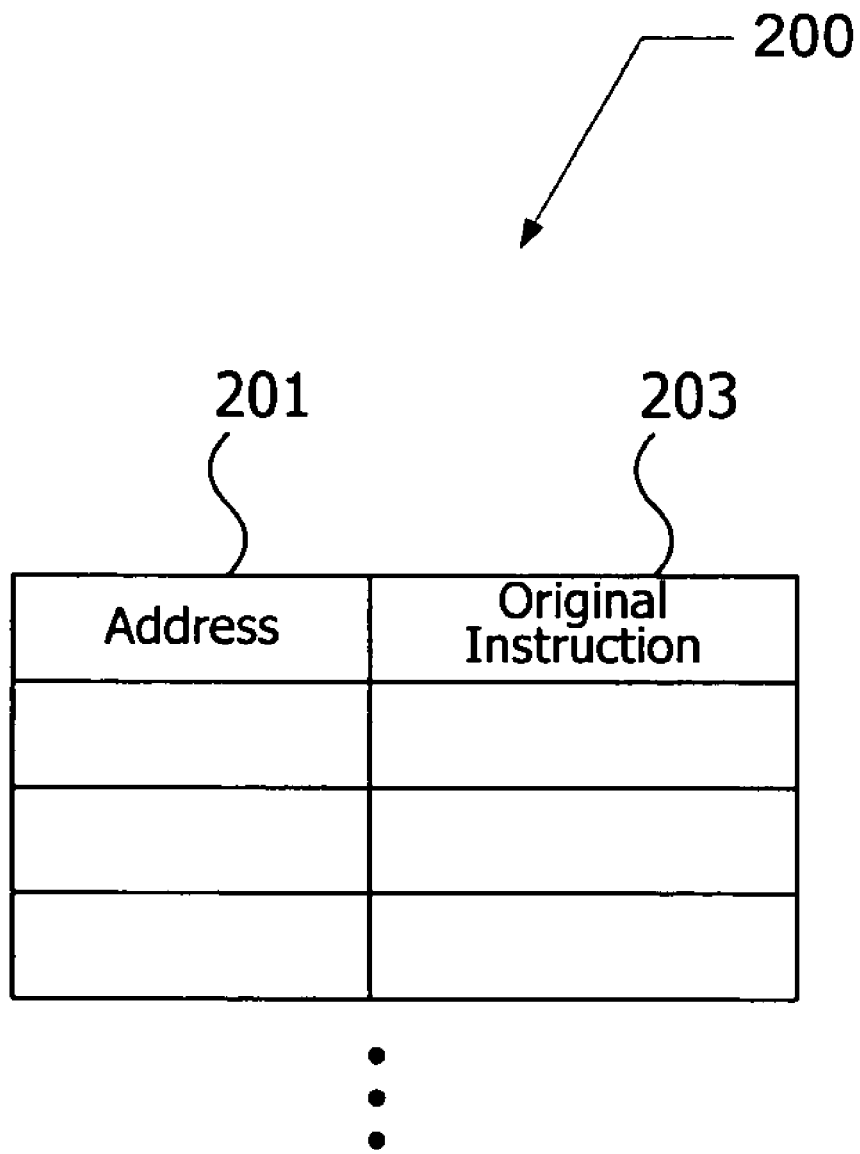
FIG. 2 shows a look-up table layout in accordance with one embodiment of the invention.

FIG. 2 shows a look-up table layout in accordance with one embodiment of the invention. As shown in FIG. 2, the look-up table (200) includes one or more entries each of which may include an address field (201) storing the address of the trap instruction within the instrumented program (115) and an original instruction field (203) storing the original instruction. The look-up table (200) may also store additional ancillary information needed to specify the address.

Figure 3:
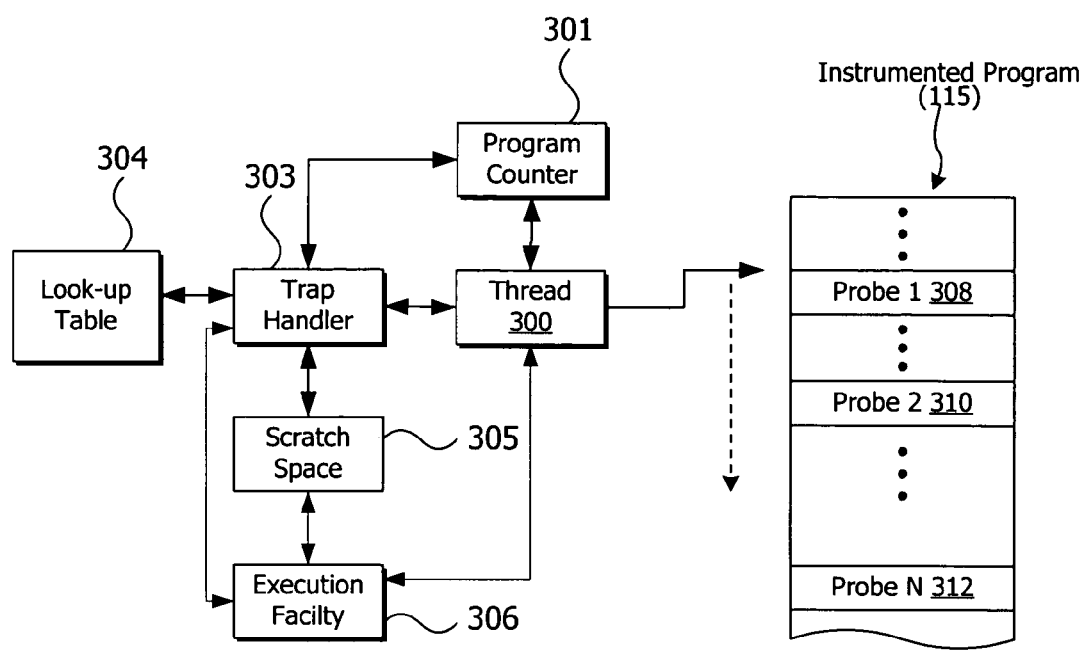
FIG. 3 shows a flow diagram in accordance with one embodiment of the invention.

FIG. 3 shows a flow diagram in accordance with one embodiment of the invention. More specifically, FIG. 3 shows a flow diagram detailing the mechanism for collecting data using a probe in accordance with one embodiment of the invention. Each component in FIG. 3 may be implemented by one or more software modules, hardware components, or any combination thereof. Further, each component shown in FIG. 3 may be distributed across one or more processors.

In FIG. 3, a program counter (301) stores a value corresponding to a current address of a thread (300) executing in the instrumented program (115). When a probe (308, 310, 312), represented by a trap instruction, is encountered by the thread (300), the thread (300) transfers control to a trap handler (303). More specifically, when a probe (308, 310, 312) is encountered a trap is triggered which is subsequently handled by the trap handler (303). The trap handler (303) searches the look-up table (304), using the program counter (301) value, to obtain the original instruction associated with the probe (308, 310, 312). In addition, the trap handler (303) calls into the tracing framework (106) to perform actions associated with the trap instruction. Those skilled in the art will appreciate that various machine architectures may require additional information, aside from the program counter, generate an address which may then be used to obtain the original instruction. In this embodiment, the trap handler (303) includes functionality to obtain such information.

Continuing with the discussion of FIG. 3, the original instruction is subsequently loaded into a corresponding scratch space (305). The scratch space (305) is typically a small address range or allocation of an address space, which is used to temporarily store the original instruction. In one or more embodiments of the invention, the scratch space resides outside the kernel. Note that if the system upon which the tracing framework (106) system upon which the supports multiple threads in a process, then the scratch space (305) is allocated on a per-thread basis. In one or more embodiments of the invention, the trap instruction is no larger than the size of the smallest original instruction that must be replaced.

An associated execution facility (306), typically a machine-specific facility, then single-steps the original instruction. In one embodiment of the invention, the execution facility (306) includes functionality to single-step the original instruction. The information collected from single-stepping the original instruction is used to update the state of the execution of the instrumented program (e.g., updating the registers, memory values, etc.). Control is subsequently returned to the thread (300) to continue execution of the instrumented program (115). Note, prior to resuming execution, the thread (or a related process) must increment the program counter to the next instruction within the instrumented program (115). Embodiments for incrementing the program counter (301) are described below.

Prior to the collection of tracing information, one or more probes (112, 114) are activated per a consumer (101) request. The activation of a probe, in accordance with one embodiment of the invention, also includes replacing the original instruction in the instrumented program (115) with a trap instruction, storing the address of the trap instruction and the associated original program in a look-up table. In one embodiment of the invention, the scratch space is allocated each time a thread is created.

Figure 4:
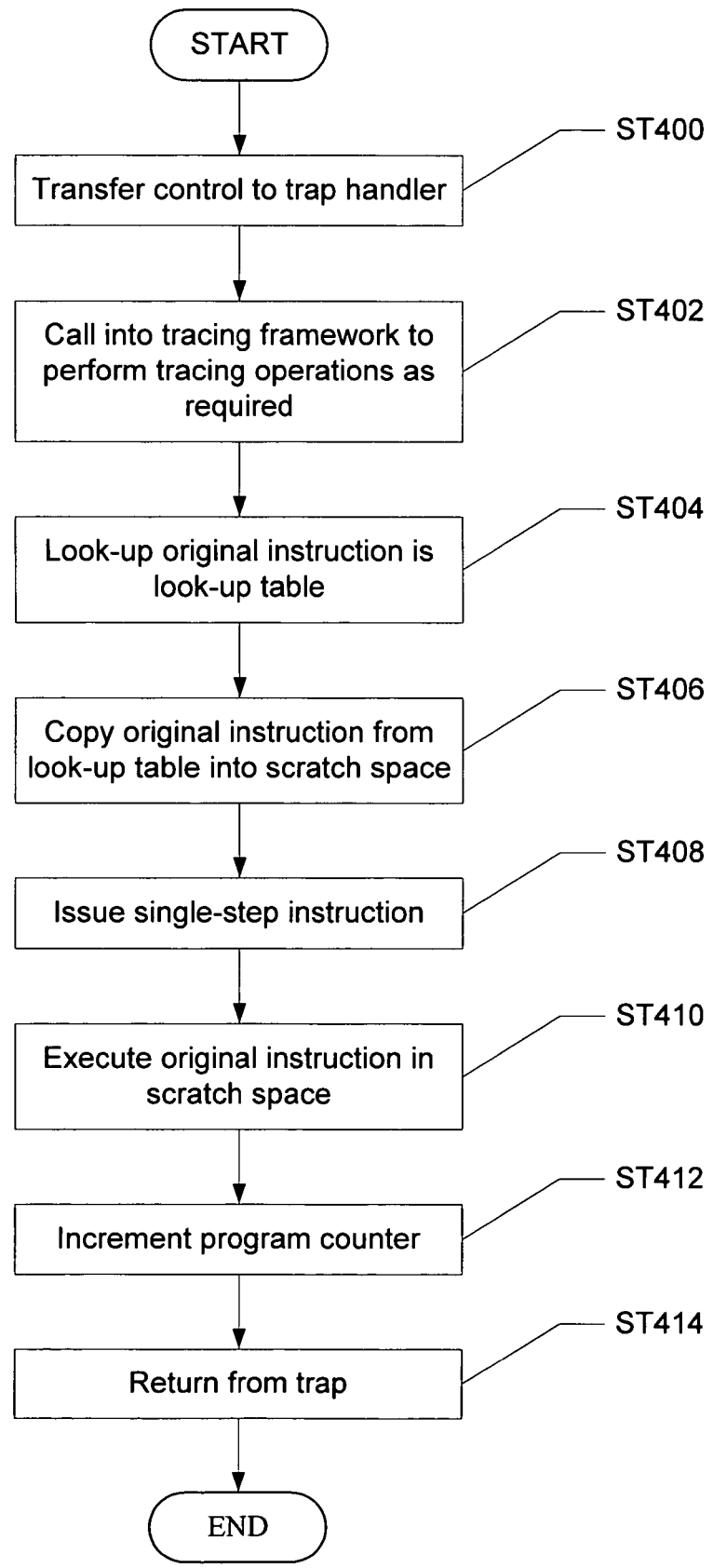
FIG. 4 shows a flowchart in accordance with one embodiment of the invention.

FIG. 4 shows a flowchart in accordance with one embodiment of the invention. More specifically, FIG. 4 shows a flowchart detailing the steps that occur when a probe (e.g., a trap instruction corresponding to a probe) is encountered by a thread executing the instrumented program. When a thread executing the instruction is encountered, the thread executing the trap instruction transfers control to an appropriate trap handler (Step 400). The trap handler calls into the tracing framework to perform tracing operations as required (Step 402). In one or more embodiments of the invention, the tracing framework performs a tracing operation and generates corresponding tracing information. The tracing information may include, but is not limited to, an argument, a pointer value, a name of a system call, etc. In addition, the tracing operation may correspond to actions specified by a consumer, that the tracing framework is to perform, when the particular trap instruction is encountered.

Continuing with the discussion of FIG. 4, after the trap handler has made the appropriate calls into the tracing framework, the trap handler looks-up the original instruction in the look-up table using the location of the trap instruction (and additional information as required) (Step 404). The original instruction is subsequently copied into a scratch space (which may be allocated on a per-thread basis) (Step 406). The trap handler then issues a single step scratch space instruction (Step 408), which updates the program counter to point to the scratch space. The original instruction is then executed in the scratch space by an execution facility (Step 410).

Continuing with the discussion of FIG. 4, the program counter is incremented by the size of the original instruction. In one embodiment of an invention, a single-step handler (not shown) increments the program counter. The trap handler then returns control back to the thread that initially executed the trap instruction. The thread then proceeds to continue executing the instrumented program. Executing the original instruction in the scratch space places the instrumented program in state that is equivalent to the state of the instrumented program, had the original instruction been natively executed.

In one or more embodiments of the invention, the original instruction is evaluated to determine if it is a control-flow instruction (i.e., an instruction that affects the value of the program counter). A branch instruction, a function call, and explicit reading of the program counter itself are examples of the control-flow instructions. If the original instruction is a control-flow instruction, then instructions whose semantics depend on the location of the original instruction (i.e., location dependent instructions, instructions that are affected by the value of the program counter), are emulated in software. The program counter and the next program counter as well as any other state with the system that would be modified by the native execution of the traced location-dependent instructions are updated based on the results of the emulation.

In one embodiment of the invention, the trap handler loads the original instruction and a control transfer instruction into the scratch space prior to executing the original instruction. The control transfer instruction includes the next program counter value (i.e., points the thread to the next instruction in the instrumented program to execute). The next program counter value may be obtained by simply adding the size of the original instruction to the current value of the program counter if the original instruction is not a control-flow instruction, or by performing the emulation process described above.

Once the original instruction and the control transfer instruction have been loaded into the scratch space and the program counter has been updated to point to the scratch memory, the execution facility may proceed to execute the original instruction and the control transfer instruction without having to single-step the original instruction. Thus, once the original instruction has been executed, the thread does not have to pause while the next program counter value is updated. Instead, once execution of the original instruction has been completed, the control transfer instruction updates the program counter and then proceeds to continue executing the instrumented program.

The invention provides an efficient means for collecting information about an instrumented program. Specifically, the invention provides a means to collect tracing information in multi-thread environment without losing tracing information.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracing an instrumented program, comprising:
   triggering a probe in the instrumented program;
   obtaining an original instruction associated with the probe, wherein obtaining the original instruction comprises searching a look-up table using a program counter value, wherein the look-up table comprises the original instruction associated with the probe and an address associated with the original instruction;
   loading the original instruction into a scratch space, wherein the scratch space is allocated on a per-thread basis; and
   executing the original instruction in the scratch space using a thread, wherein executing the original instruction results in placing the instrumented program in a state equivalent to natively executing the original instruction.

2. The method of claim 1, further comprising:
   emulating a location dependent instruction to determine a value of a program counter if the original instruction is a control-flow instruction wherein semantics of the location dependent instruction depend on a location of the original instruction within the instrumented program.

3. The method of claim 1, further comprising:
   incrementing a value of a program counter using a size of the original instruction.

4. The method of claim 1, further comprising:
   determining a value of a program counter; and
   loading the value of the program counter into the scratch space.

5. The method of claim 4, wherein determining the value of the program counter comprises:
   incrementing the value of the program counter using a size of the original instruction if the original instruction is not a control-flow instruction; and
   emulating a location dependent instruction to determine the value of the program counter if the original instruction is a control-flow instruction.

6. The method of claim 1, furthering comprising:
   loading a control transfer instruction into the scratch space prior to executing the original instruction.

7. The method of claim 6, wherein the control transfer instruction includes a value of a program counter.

8. The method of claim 1, wherein the probe corresponds to a trap.

9. The method of claim 1, wherein the instrumented program is executed on multi-thread architecture.

10. The method of claim 1, wherein executing the original instruction comprises single-stepping the original instruction.

11. The method of claim 1, wherein executing the original instruction comprises single-stepping the original instruction.

12. A system for tracing an instrumented program, comprising:
- a thread configured to execute the instrumented program;
- a look-up table arranged to store an address and a corresponding original instruction;
- a trap handler configured to halt execution of the thread when a trap instruction is encountered and using an address of the trap instruction to obtain the corresponding original instruction from the look-up table;
- a scratch space arranged to store the original instruction, wherein the scratch space is allocated on a per-thread basis; and
- an execution facility for executing the original instruction in the scratch space to obtain data.

13. The system of claim 12, further comprising:
- a buffer for storing the data.

14. The system of claim 12, further comprising:
- a tracing framework emulating a location dependent instruction to determine a value of a program counter if the original instruction is a control-flow instruction.

15. The system to claim 12, wherein the trap handler sets the value of the program counter to the value of a next address immediately the address of the trap instruction after executing the original instruction.

16. The system of claim 12, wherein the trap handler increments a value of a program counter using a size of the original instruction if the original instruction is not a control-flow instruction.

17. The system of claim 12, wherein the instrumented program is executed on multi-thread architecture.

* * * * *